UNITED STATES PATENT OFFICE.

FENN O. STONE, OF CINCINNATI, OHIO.

PROCESS OF MAKING CAKES.

998,650.

Specification of Letters Patent. Patented July 25, 1911.

No Drawing. Application filed July 18, 1910. Serial No. 572,480.

*To all whom it may concern:*

Be it known that I, FENN O. STONE, a citizen of the United States of America, and resident of Cincinnati, county of Hamilton, State of Ohio, have invented certain new and useful Processes of Making Cakes, of which the following is a specification.

The object of my invention is a process of making cakes, whereby cakes of a whiter, more fluffy texture, and which remain moist and sterile, and are less subject to mold, may be obtained in any kind of weather.

My invention relates to the process of mixing the ingredients which form the cake. Heretofore, in mixing together these ingredients, no attention has been paid to the temperature of the ingredients at the time of mixing them. As a result, it was not possible to get uniform cakes. Even though they were made under the same recipe, they varied both as to color, taste, texture and keeping qualities.

I have discovered that by having the different ingredients at temperatures within certain limits, at the time of mixing the ingredients, I have been able to obtain the object above set forth. This uniformity of result is had irrespective of the particular proportions and characters of the ingredients.

I will describe my process as applied to a certain recipe, and will then indicate the scope of my invention in my claim.

In carrying out my process, I first mix together fat and sugar. The fat may be either animal fat, such as butter, or vegetable fat, such as cocoanut oil. The proportions of the fat and sugar may be 18 lbs. of fat to 27 lbs. of sugar. The butter or fat is to be creamed or rubbed together with the sugar, and to be held between 70 degrees and 80 degrees Fahrenheit during the creaming and while it is being mixed with the second mixture, which consists of whites of eggs and sugar. The proportions of eggs and sugar are 38 lbs. of whites of eggs to 20 lbs. of sugar. The whites of eggs are beaten together with the sugar, and are to be worked or beaten at temperatures varying between 50 degrees and 65 degrees Fahrenheit, between which temperatures they are held until added to the mixture of fat and sugar. To the first two mixtures a third mixture is then to be added. This third mixture consists of milk and sugar. The milk is previously boiled with its sugar and then it is cooled. The sugar and the milk are mixed together in proportions of 30 quarts of milk to 30 lbs. of sugar. This mixture of milk and sugar is added to the mixture of the first two mixtures above described, between temperatures of 60 degrees and 75 degrees Fahrenheit. This completed mixture then is added to 80 lbs. of flour and worked into a dough.

I have found that by having the butter or fat between temperatures specified, that the globules of fat are thoroughly broken up and mixed with the sugar, so that when the cold mixture of egg and sugar is added, slowly thereto, each globule of fat becomes coated with egg. This gives the mixture a firm or stiff texture, which it retains until the mixture with the milk and the sugar is completed. By previously boiling the milk as afore described, its mixture with sugar can be made in large quantities and preserved for use, and it can be worked into the mixture even during a rain storm, without danger of souring. By cooking the milk and sugar, I prevent the water of the milk from separating from its solids.

After the dough is cooked, I find that the resulting cakes are of a whiter and more fluffy texture, that they have much better keeping qualities, and that the results obtained whether in summer or winter, or in dry or wet weather, are uniform, so that purchasers of these cakes know that they will obtain a uniformly good product.

What I claim is:—

A process of making cakes in which a first mixture of fat and sugar is made at a temperature between 70 and 80 degrees Fahrenheit, a second mixture of whites of eggs and sugar is brought to a temperature between 50 and 65 degrees Fahrenheit and is added to the first mixture, a third mixture of milk and sugar at a temperature between 60 and 75 degrees Fahrenheit is added to the first two mixtures, and then the three mixtures are worked with flour into a dough and cooked.

FENN O. STONE.

Witnesses:
C. H. BARTH,
WALTER F. MURRAY.